_United_ States Patent Office 3,496,959
Patented Feb. 24, 1970

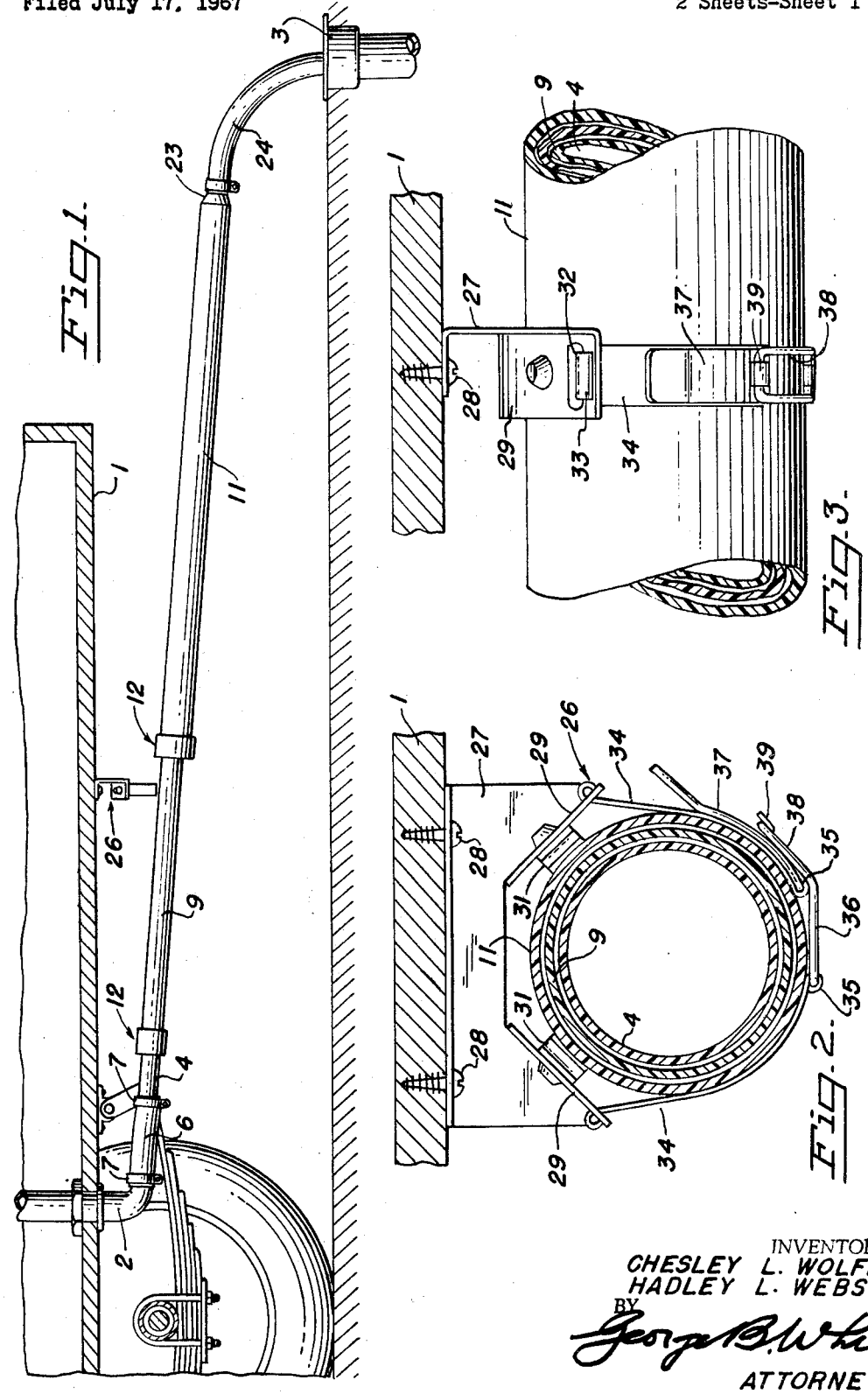

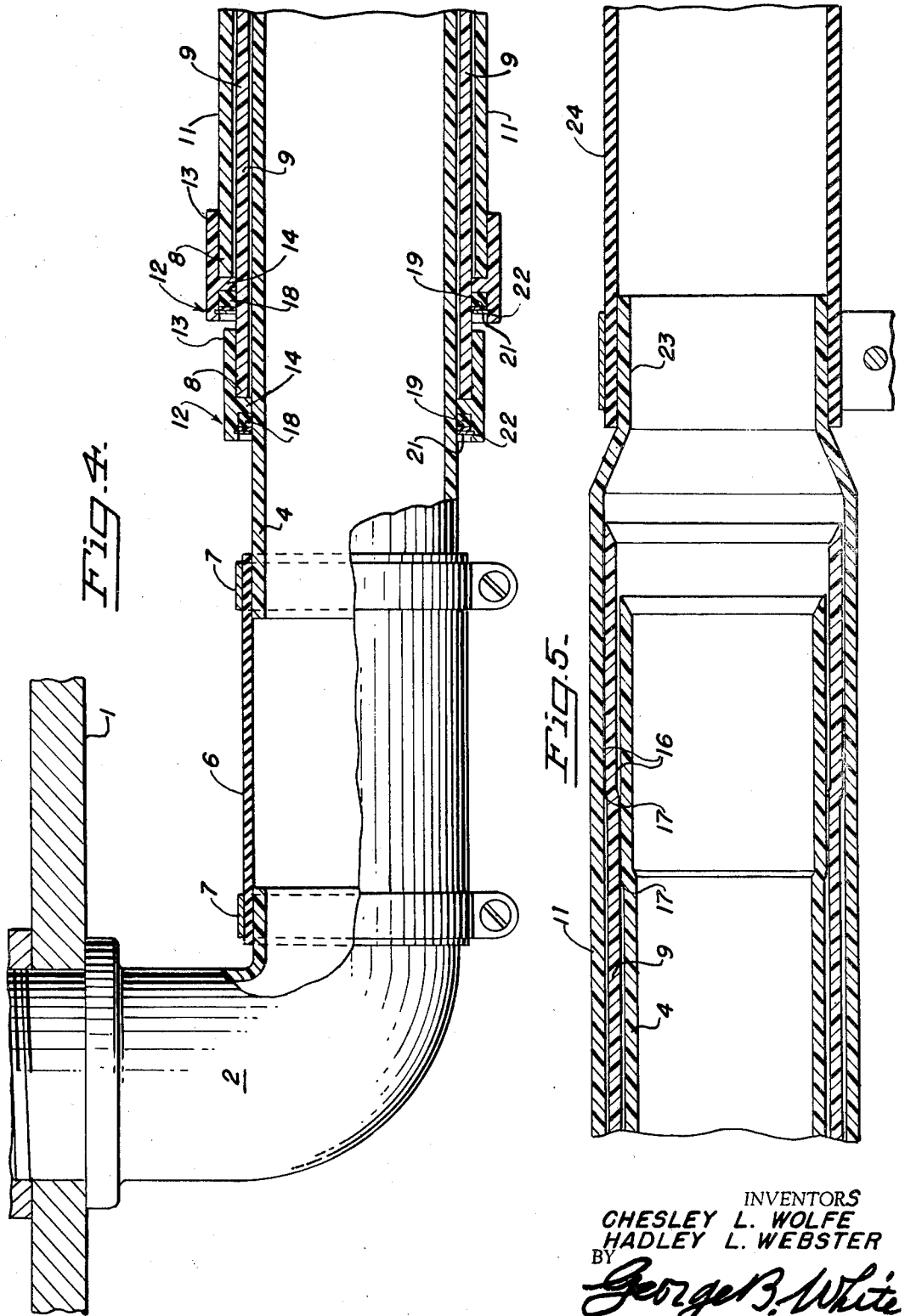

3,496,959
TRAILER HOUSE DRAIN CONNECTION
Chesley L. Wolfe, 412 Cherrycreek Road, and Hadley L. Webster, P.O. Box 515, both of Cloverdale, Calif. 95425
Filed July 17, 1967, Ser. No. 653,935
Int. Cl. B60p *3/32;* B60r *15/04*
U.S. Cl. 137—344                  2 Claims

ABSTRACT OF THE DISCLOSURE

An extensible disposal conduit between the sewer drain of a trailer house and the intake to an underground sewerage system; the improvement consists of a plurality of telescopic tubes, preferably made of rigid but light plastic; the intake end of the innermost tube is connected by a flexible conduit to the outlet drain of the trailer house, and the discharge end of the outermost tube is connected by a flexible hose into an intake of the underground sewage system; the intake end of each of the outer tubes has on it an integral fitting, an inwardly projecting flange of which extends slightly beyond the inner periphery of the respective tube; the fitting extends beyond the projecting flange and a quadring therein is placed against the outer face of the projecting flange; the quadring is a compressible packing ring and it is held in place by a snap ring; the next inner tube has a portion of a reduced diameter fitting slideably in the inner periphery of the packing, but has its discharge end enlarged to slideably engage the inner periphery of the next outer tube; the shoulder thus formed abuts against the projecting part of the packing flange to prevent the disengagement of the tubes; a pipe hanger is mounted on the bottom of the trailer house on which pipe hanger the collapsed tubes hang when not in use in close proximity to the bottom of the trailer house; quick disengaging clamp on the pipe hanger permits the easy release of the telescopic tubes so that they can be extended and inclined to the sewerage intake.

BRIEF DESCRIPTION OF THE INVENTION

In the prior art the outlet drain of a trailer house is connected to a sewer in a trailer court by a thin fabric rubber impregnated flexible hose with spiral spring wire inside to keep it from collapsing; such house is not approved by state sanitary departments; other devices with telescopic tubes were heavy and bulky and required loosening and tightening of connections between telescopic parts for extending and collapsing, and had no guides to prevent binding between telescoping parts; in the present invention the connection is light and easily collapsible and extensible yet it is rigid in both positions; it can be hung in close proximity to the bottom of the trailer house in an out of the way position without the need for detaching it from the trailer house; the telescopic tubes are positively guided within one another and binding between them is eliminated as well as separation of the tubes when extended is prevented.

DESCRIPTION OF FIGURES

FIG. 1 is a fragmental partly sectional view of the lower portion of a trailer house showing the disposal conduit extended.

FIG. 2 is a cross-sectional view taken through the collapsed tubes and showing the same hanging on the pipe hanger.

FIG. 3 is a fragmental side view of the collapsed tubes hanging on the pipe hanger.

FIG. 4 is a fragmental view of the intake end of the disposal conduit in collapsed position.

FIG. 5 is a fragmental view showing the discharge end of the disposal conduit.

DETAILED DESCRIPTION

On the bottom 1 of a house trailer there is usually a drain outlet 2 which is supposed to be connected to a sewerage intake 3 to the underground sewerage system of a trailer court or the like. The sewerage intake 3 in some courts is slightly under the ground level and in others it projects above the ground level.

The disposal conduit herein includes a plurality of tubes, preferably made of suitable plastic so as to form light but rigid telescopic sections. The innermost tube 4 has its intake end connected by a flexible member such as a short hose 6 to the drain outlet 2 held by suitable clamps 7 at the respective ends of the hose 6. The intake ends 8 of the outer tubes 9 and 11 respectively are provided with a plastic gland 12. The cylindrical fitting or casing 13 of each plastic gland 12 is integrally united with the adjacent intake end 8. In the present illustration the gland casing 13 is made of rigid plastic and it is cemented rigidly to the outer periphery of the respective intake end 8. The casing 13 extends beyond the intake end 8 so as to project over the adjacent inside tube 4 and 9 respectively. An interior flange 14 in each gland casing 13 abuts against the intake end 8 and projects inwardly slightly beyond the inner periphery of the intake end 8.

Each of the inner tubes 4 and 9 have a portion of reduced diameter spaced from the inner periphery of the respective adjacent outer tubes 9 and 11 but being slideable within the inner periphery of the annular flange 14. The discharge end of each of the inner tubes 4 and 9 is enlarged exteriorly for slideable contact with the inner periphery of the adjacent outer tube, thereby forming a bearing surface 16 at the discharge end of each inner tube. The shoulder 17 formed by the enlarged bearing surface 16 abuts against the annular flange 14 of the packing gland 12, thereby to prevent the separation of the tubes when extended.

A compressible quad ring 18 is pressed against the outer surface of each annular flange 14 and is held bearing against the reduced periphery of each of the inner tubes 4 and 9 respectively by means of a retainer ring 19 and a snap ring 21 held in a circular groove 22 in the projecting end of the gland housing 13. The spacer ring 22 is of such thickness as to cause the compression of the quad ring 18 into firm contact with the reduced periphery of the respective inner tube 4 and 9 and thereby not only providing a packing but also providing another bearing surface for each inner tube 4 and 9 and thereby prevent binding of the tubes.

The discharge end of the outermost tube 11 has a reduced portion 23 to accommodate standard trailer fitting hose connection 24.

The length of the tubes is such that the collapsed or telescoped tubes are accommodated completely under the bottom 1 of the house trailer and do not project beyond it. The collapsed tubes are held in an out of the way position by a pipe hanger 26 of the type shown in FIGS. 2 and 3. An angle bracket 27 is secured by screws 28 to the trailer bottom 1. The lower end of the angle bracket 27 is cut away as shown in FIG. 2 and has a pair of inclined flanges 29 extended at right angles to the body of the bracket. Each inclined flange 29 has a nesting cushion 31 on its inner face spaced correspondingly to the outer diameter of the outer tube 11. Near the lower end of each inclined flange 29 is a slot 32 and in each slot 32 is hung a hook 33 on the end of an arcuate band 34. On the lower end of each band 34 is formed a bearing 35. In the bearing 35 of one of the bands 34 is pivoted a bent strap 36. In the bearing 35 of the other band 34 is pivoted a handle 37. In the bent end of the strap 36 is a keeper 38. On the outer face of the curved handle 37 is a finger 39 which is hooked into the keeper 38 and is pulled into the locked position as shown in FIGS. 2 and 3, so that the telescoped unit is nested against the cushions 31 and by its weight exerts outward force on the bands 34 and thereby maintains the hanger clamp in the locked position.

The telescoped tubes can be quickly released by turning the handle 37 in a clockwise direction viewing FIG. 2 and disengaging the finger 39 from the keeper 38 to drop the conduit. Then the outer tube 11 is pulled longitudinally and when its packing abuts the shoulder 17 of the next inner tube 9 it pulls the inner tube 9 also until the conduit is extended to the desired distance for connection to the sewerage intake 3. The drain connection 6 being flexible, the conduit assumes an inclined attitude as shown in FIG. 1 and affords unobstructed flow of sewage.

We claim:

1. In an extensible disposal conduit for conducting sewage from the drain outlet of a trailer house to the intake of an underground sewerage system, the improvement of
   (a) a plurality of rigid telescoping tubes, each tube having an intake end and a discharge end,
   (b) a flexible conduit connecting the intake end of one of said tubes to said drain outlet,
   (c) detachable connection between the discharge end of another tube to connect to said sewerage system intake,
   (d) said tubes being so telescoped that when extended contiguously said intake end and said discharge end are on the opposite ends of the extended conduit,
   (e) releasable hanger means on said trailer house spaced from said drain outlet for supporting the telescoped conduit in an out of the way position,
   (f) spaced guide means between adjacent tubes to guide said adjacent tubes longitudinally during extension and collapsing,
   (g) one of said guide means being a packing gland on the intake end of each tube slideably engaging the next tube telescoped therein to prevent escape of liquid and gas between adjacent tubes,
   (h) the other of said guide means being an exterior shoulder formed on each inner tube slideable in the next adjacent outer tube and being spaced from the outlet end of said inner tube and being engageable with said packing gland for transmitting longitudinal adjusting movement from the outer tube to the adjacent inner tube,
   (i) said packing gland having a part projecting inwardly of the respective tube for said slideable engagement with the next adjacent inner tube and being abutted by said shoulder to predetermine the relative extension of adjacent tubes and being abutted by said shoulder.

2. The extensible disposal conduit defined in claim 1, and said releasable hanging means including,
   (h) a bracket secured to said trailer house spaced from said drain outlet,
   (i) spaced inclined nesting elements projecting from said bracket to engage the outermost tube of the telescoped conduit on opposite sides of the portion thereof adjacent to said trailer house,
   (j) opposite straps hanging from said bracket adjacent said inclined nesting elements for embracing said outermost tube,
   (k) and releasable fastening means to clamp said straps together tightly about said outermost tube.

References Cited
UNITED STATES PATENTS

| | | | |
|---|---|---|---|
| 2,466,247 | 4/1944 | Land | 248—62 |
| 2,915,081 | 12/1959 | Warren | 137—344 |
| 2,953,161 | 9/1960 | Muller | 137—615 |
| 2,994,499 | 8/1961 | Waters | 248—74 |
| 3,103,375 | 9/1963 | McMullin | 287—58 |
| 3,355,194 | 11/1967 | Rasmussen | 285—302 |

SAMUEL SCOTT, Primary Examiner

U.S. Cl. X.R.

137—615